June 14, 1960            G. S. WING            2,940,495
LOCK NUT WITH FRANGIBLE DRIVING PORTION
Filed Feb. 28, 1957            2 Sheets-Sheet 1
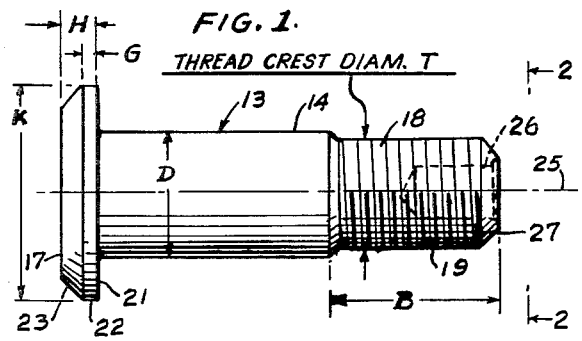
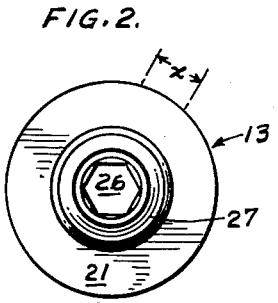
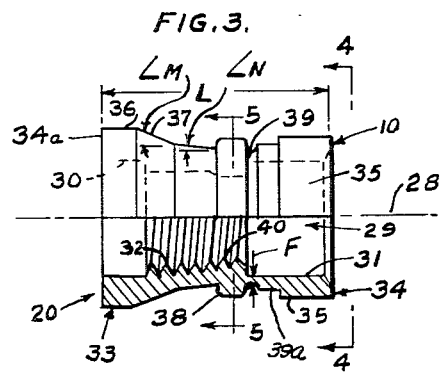
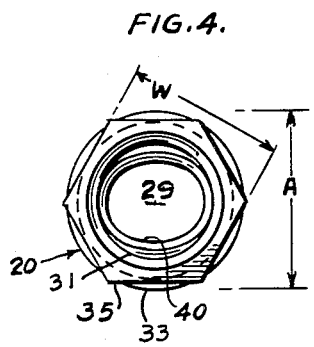
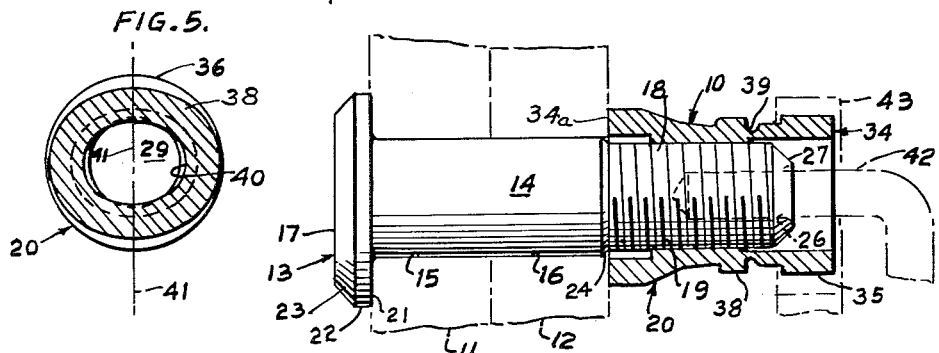
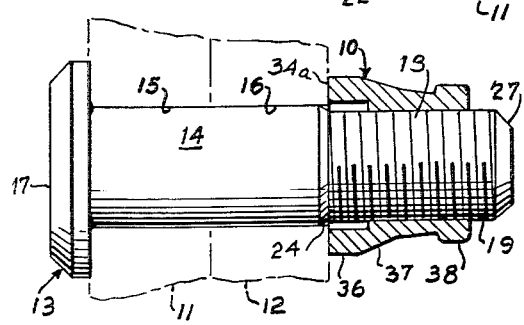
INVENTOR.
GEORGE S. WING
BY
D. Gordon Angus
ATTORNEY June 14, 1960  G. S. WING  2,940,495
LOCK NUT WITH FRANGIBLE DRIVING PORTION
Filed Feb. 28, 1957  2 Sheets-Sheet 2
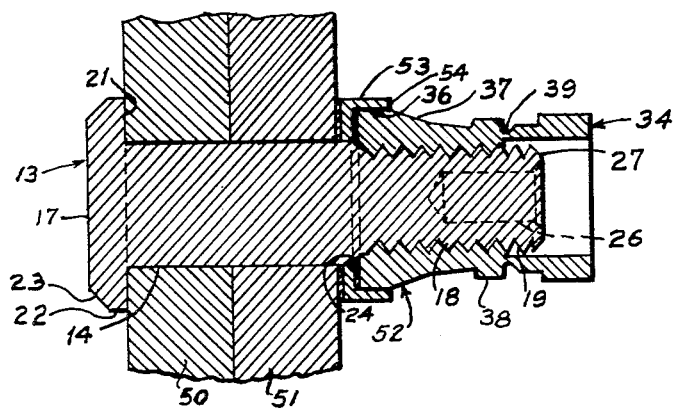
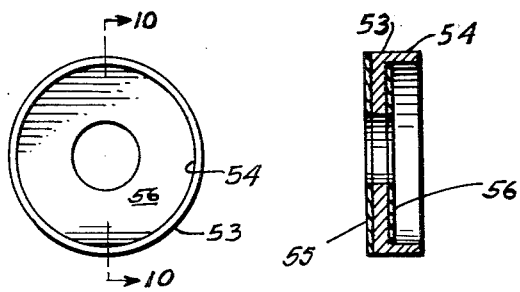
INVENTOR.
GEORGE S. WING
BY
D. Gordon Angus
ATTORNEY.

United States Patent Office 2,940,495
Patented June 14, 1960

2,940,495

LOCK NUT WITH FRANGIBLE DRIVING PORTION

George S. Wing, Palos Verdes Estates, Calif., assignor to Hi-Shear Rivet Tool Company, Torrance, Calif., a corporation of California Filed Feb. 28, 1957, Ser. No. 643,183

2 Claims. (Cl. 151—21)

This invention relates to fasteners, and in particular to a threaded fastener having torque-limiting features.

An object of this invention is to provide a threaded fastener which is provided with means for indicating whether a predetermined torque has been applied thereto, and which means also limit the torque which can be applied to some predetermined value.

A further object of the invention is to provide means for retaining the fastener in its torqued condition.

According to this invention, a collar is provided which is adapted to be threaded onto a bolt (sometimes called a pin) and against an object. The collar has an axial opening therethrough with a counterbore at each end and a set of interior threads between the counterbores. The exterior surface of the collar extends from a first annular end toward the second end. An exterior tapered section has its larger end closer to the first end of the collar. Its smaller end is contiguous to an enlarged circumferential bead. A groove is formed contiguous to the bead on the opposite side from the tapered section. The groove is substantially axially aligned with the intersection of the counterbore closer to the second end of the collar and the interior threads. A transition section is adjacent to the groove, and a wrench-engaging section is adjacent to the transition section, on the other side from the groove. The transition section has a greater cross-section area and greater corresponding exterior transverse dimensions than the cross-section of the collar at the groove, and less ones than the wrench-engaging section.

According to a feature of the invention, the collar is pressed out-of-round at the circumferential bead, and due to the presence of the tapered and transition sections, the out-of-round condition is substantially confined to that portion of the collar at the bead, and the first end and the wrench-engaging section are not out-of-round, thereby enabling the nut to be easily threaded onto a bolt, and enabling a wrench to be applied to undistorted wrench-engaging surfaces.

The above and other features of this invention will be fully understood from the following detailed description and the accompanying drawings, of which:

Fig. 1 is an elevation of a pin according to the invention;

Fig. 2 is an end view taken at line 2—2 of Fig. 1;

Fig. 3 is an elevation of a collar according to this invention;

Fig. 4 is an end view taken at line 4—4 of Fig. 3;

Fig. 5 is a cross-section taken at line 5—5 of Fig. 3;

Fig. 6 is a side view, partly in cross-section, of a fastener according to this invention in the process of being tightened;

Fig. 7 is a side view, partly in cross-section, showing the fastener of Fig. 6 in its finally-tightened condition;

Fig. 8 is a cross-section of another fastener according to this invention;

Fig. 9 is a plan view of a part of the fastener of Fig. 8; and

Fig. 10 is a cross-section taken at line 10—10 of Fig. 9.

A fastener 10 according to this invention is shown in Fig. 6, about to be tightened so as to join a pair of bodies 11, 12. This fastener comprises a pin 13 having a shank 14 which passes through registering holes 15, 16 in the bodies 11, 12, respectively. A head 17 on one end of the pin abuts against body 11 and a threaded end 18 having external circumferential threads 19 thereon projects beyond the body 12. When the fastener is installed, these threads are engaged by a collar 20.

As will be seen from an examination of Figs. 1 and 2, the head of the pin may conveniently have a body-engaging surface 21 in the form of a flat annulus, a cylindrical section 22 adjacent the surface 21, and a frusto-conical chamfered section 23 adjacent the cylindrical section. It will be understood that other types of heads can be provided on this type of pin, such as countersunk or flat-head if desired, this type of head being given merely as one example.

The major diameter of the thread is relieved so that the maximum thread diameter is somewhat less than the diameter of the shank. The pin has a longitudinal axis 25. In the threaded end 18 of the pin there is sunk a wrench-receiving recess 26, on the said axis. This recess is preferably hexagonal for receiving an Allen-type wrench to hold the pin against turning. It can conveniently be formed by a broaching process. For convenience in assembling the fastener, a chamfer 27 is formed at the threaded end of the pin.

A collar 20 according to this invention is shown in detail in Fig. 3. This collar has a longitudinal axis 28 and a pin-receiving hole 29 located on said axis. Counterbores 30, 31, are provided at each end of the hole 29, and threads 32 are formed in the inner wall of the hole 29 between the two counter bores. This inner wall thereby comprises the two counterbores, and the threads 32. The diameters of the counterbores are both larger than the maximum diameter of the threads 32.

The nut has a bearing end 33 and a wrench-receiving end 34. The bearing end 33 has a flat annular surface 34a for engagement with a body, such as body 12, when the fastener is tightened down. The wrench-receiving end has a plurality of wrench-engaging surfaces 35, which can receive a wrench such as a socket 43 or a crescent for turning the collar on to the pin.

Immediately adjacent to the bearing surface 34a, there is a short cylindrical surface 36 which is joined by a tapered section 37, which taper reduces in diameter until it reaches a position contiguous to a bead 38. This bead is an enlarged external circumferential bead around and integral with the outer wall of the nut. The taper is provided for the purpose of reducing the weight of the collar where so much material is unnecessary. Taper angles M and N may conveniently be 15° and 5°, respectively, but it will be understood that these angles may be made somewhat different. Immediately contiguous to the bead there is a groove 39 in the outer wall of the collar. The bead is thus disposed between the groove 39 and the bearing end of the collar. The groove is disposed between the bead and the wrench-engaging surfaces.

A transition section 39a is provided adjacent to and between the groove and the wrench-engaging section. The transition section is cylindrical. It has a lesser cross-section area and lesser corresponding exterior transverse dimensions than the wrench-engaging section, and a greater cross-section area and greater corresponding exterior transverse dimensions than the collar at the groove. Thus the transition section is more flexible than the wrench-engaging section, and thereby serves to isolate the latter section from distortive forces when the bead is pressed out-of-round, and is stronger than the grooved section so that torque-off always occurs at the groove.

The terms "radial" and "transverse" are used interchangeably in this specification and in the claims to define dimensions measured normal to the central axis of the collar.

As can be seen from the drawings, particularly in Fig. 3, the thickness of the collar as measured radially between the inner wall of the hole 29 and the outer wall of the collar (said outer wall comprising cylindrical surface 36, tapered section 37, bead 38, groove 39, transition section 39a, and wrench-engaging surfaces 35) is the least at the groove (dimension F in Fig. 3), so that when torsional forces are applied to said nut, the section at the groove will be the first to shear. It will also be observed that the interior threads 32 in the collar end approximately axially adjacent the groove and that the counter bore 31 also ends approximately axially at the groove.

In order to provide for retention of the collar on the pin after setting, the collar, which may have been manufactured on an automatic screw machine, and thereby turned out perfectly round, except for the wrench-engaging surfaces, may conveniently be distorted out-of-round by the application of force on diametrically opposed points on surface 38. A preferred form of this distortion is an ellipse such as is shown in Fig. 5. Fig. 5 shows the collar with its section at the bead distorted so that an ellipse 40 is formed having a minor axis 41 which comprises at least one diametrical dimension of the inner wall which is less than the diameter of the threads on the pin. The two ends of the nut such as the cylindrical section 36 and the hexagonal section having the wrench-engaging surface 35, will conveniently retain their circular and hexagonal sections, respectively, and for this purpose the wall thicknesses at these places are greater than the wall thickness at the portion adjacent the bead. Therefore the central portion of the collar can be deformed without substantially distorting the other two ends. The threads 19 of the pin may therefore be easily started in the substantially round portions of the threads 32 nearer the bearing end, and a wrench may easily be applied to the undistorted wrench-engaging surfaces.

A cylindrical section 39a is provided just between the groove and the wrench-engaging surfaces. This cylindrical section 39a is of lesser diameter than the hex dimension A. For a 3/16" hex dimension A, the diameter of 39a may be .238±.002 inch, the diameter of counterbore 31 being .197±.001 inch. The diameter of the bottom of groove 39 may be .214±.001 inch. The reduced diameter at 39a has been found desirable to keep the nut from failing at groove 39 when force is applied to distort surface 38, and consequently the thread portion out of round.

In Figs. 8–10, there is shown another embodiment of the invention. One problem which sometimes arises in torquing collars onto pins resides in the variability of the reaction force between the workpiece and the collar, or between the collar and whatever other element it may abut, such as a washer. This reaction force may vary for a given nut from installation to installation, depending on surface finish, cleanliness, and other factors which influence friction and are difficult to control.

Because of the variation in the reaction force due to bearing of the collar with the workpiece which it is tightened against, the torque on the collar might be indicated properly, but the pre-stress on the bolt might at that time be wrong. An object of this invention is to provide proper and highly uniform pre-stress resulting from a uniform tensile preload as a consequence of a known torque resulting from controlled physical properties at the torsional shear off area plus a constant coefficient of friction between the collar and the work piece which the nut abuts. If reaction force is thus kept predictable then a correct pre-load indication can be obtained, because the two variables (torque and reaction force) are then under control.

The above problems are solved in this invention by providing a layer of substantially dry lubricant between the collar and workpiece which the collar abuts. The presently-preferred type of lubricant is a polar wax compound, which is substantially dry. One example of this type of compound is sold by S. C. Johnson & Son, Inc., located at Racine, Wisconsin, under the name #153 Wax Lubricant "Tube Draw." This lubricant is provided in an evaporable liquid base. The base evaporates before the lubricant is used as described below, leaving the dry wax. A polarized lubricant has been found to be most useful inasmuch as it is very difficult to remove from a surface. Once the above liquid compound has dried, the wax remaining on the treated surface can be removed only by using a strong solvent. There are other suitable dry lubricants that may be baked on or applied electrolytically, or chemical lubricants such as molybdenum disulphide, but the polar wax is preferable by reason of cost and convenience.

Figs. 8–10 show a means for advantageously utilizing such a lubricant. A pair of plates 50, 51 to be joined together are shown pierced by a pin 13 such as the pin shown in Fig. 1. A collar 52 is threaded onto the protruding end of the pin. Collar 52 is identical in all details to collar 20, except that it may, if desired, be made as shown without counterbore 30.

A washer 53, which can be made in various thicknesses to provide the desired shim size, is spaced between the work and the collar. The washer has an annular centering flange 54 at its outer periphery which may be used to aid in making a preassembly of its collar and washer.

Layers 55, 56 of lubricant of the type described above, are applied to each of the opposite flat sides of the washer. The thickness of the layer is shown relatively larger than it actually is in comparison to the washer thickness for purposes of illustration. It will be recognized that this layer need be little more than a film in order to do its work. Layer 55 is optional.

The installation of the fastener of Figs. 1–7 will now be described. The bodies to be joined such as bodies 11 and 12 are first placed with their holes 16 and 17 in registration, and the pin 13 is then passed therethrough so that its head 17 bears against one of the bodies. Thereafter, the collar 20 is threaded on to the threads of the pin, and is ready to be tightened down. For this purpose an Allen-head wrench 42 (see Fig. 6) may be inserted to the wrench receiving recess 26 of the pin so as to hold the pin against rotation. A wrench such as a socket 43 can be placed over the hexagonal wrench engaging surfaces 35. Thereafter either or both of the wrenches can be counter-rotated, and the nut can be tightened onto the bolt. A convenient mechanical wrench including both of these wrench elements is shown in my co-pending application Serial No. 664,634, filed June 10, 1957, entitled "Tool for Shear Nut," now U.S. Patent No. 2,882,773, issued April 21, 1959, entitled "Bolt Holding Wrench."

Until a sufficient torque is applied that the shear strength of the collar at the groove section is exceeded, the collar will simply be tightened down on to the pin. However, after a predetermined torque is reached, the shear strength of the section at the groove 39 will be exceeded, and the hexagonal section will be sheared off, leaving the portion of the fastener to the left of the groove in Fig. 7 tightened on to the bolt with a predetermined and known torque.

In applying this collar to this pin, the pin has tended to round out the collar in opposition to the restoring forces tending to retain the collar in its distorted oval shape. These restoring forces cause the collar to clamp tightly on to the pin and retain it against being shaken free. The device is therefore held in its torqued position in a substantially shake-free condition. This retention is materially aided by the bead 38 which strengthens the end of the collar and gives increased restoring forces where they are most needed. In addition this bead resists any tendency of the collar to crack axially when the hexagonal section shears off in setting.

Counterbore 30 enables a wide range of grip sizes of pin to be used with the same collar, and the same thickness of bodies, because the counterbore section does not have to engage the pin, and can simply move along the shank 14 of the pin. A pin of a given grip length can thereby be used on different body thicknesses with this collar. Therefore this fastener has a substantial grip range, and fewer individual fastener sizes need to be stocked. Counter bore 31 enables the sheared-off hexagonal portion of the collar to fall free, inasmuch as this section does not thread onto the pin.

Suitable dimensions for a fastener of these types are given below, the reference numerals and letters relating to those shown in the drawings. In collar 52, the counterbore 30 may be omitted. The pin 13 may conveniently be made of MST 6AL-4V titanium, heat-treated to 95,000 p.s.i. shear, while the collar may conveniently be 2024 aluminum alloy, precipitation hardened to 41,000 p.s.i. shear. Torques at which the hexagonal sections shear off are also given in the table below.

Table

PIN 13

|   | K | B | D | T | G | H | Threads 19 | X |
|---|---|---|---|---|---|---|---|---|
| ¼ | .412 | .370 | .2495 | .2465 | .030 | .069 | ¼″ 28 UNF-3A | ⁵⁄₃₂″ Hes. |
|   | .387 |  | .2490 |  |  | .059 |  |  |
| ⁵⁄₁₆ | .505 | .425 | .3120 | .3085 | .035 | .078 | ⁵⁄₁₆″ 24 UNF-3A | ⁵⁄₃₂″ Hes. |
|   | .475 |  | .3115 |  |  | .068 |  |  |

COLLAR 20

|   | A | L | Threads 32 | Hexagonal Dimension "W" | F, inches | Torque off, inch-lbs. |
|---|---|---|---|---|---|---|
| ¼ | .403 | .467 | ¼″ 28 UNF-3B | 1½₃₂″ | .015 | 70-85 |
|   | .397 | .457 |  |  |  |  |
| ⁵⁄₁₆ | .483 | .573 | ⁵⁄₁₆″ 24 UNF-3B | ⁷⁄₁₆″ | .015 |  |
|   | .477 | .563 |  |  |  |  |

It is to be understood that the pin could be held against rotation at its headed end by means such as an Allen-head wrench, or even an ordinary slot and screw driver, the examples shown being only the preferred embodiments of the invention.

The provision of the lubricated washer, which may have its lubrication on one or both of its flat sides, provides, in addition to torque-control and torque-limit means, which are supplied by the collar, an additional assurance that reaction forces due to bearing of the collar against another surface are constant and predictable.

This invention is not to be limited by the embodiments shown in the drawing and described in the description, which are given by way of example and not of limitation, but only in accordance with the scope of the appended claims.

I claim:

1. A collar adapted to be threaded onto a bolt against an object and to fracture at a predetermined torque, said collar having a central axis, a pair of ends, an exterior surface, and an interior wall defining a central axially extending opening; said interior wall including: a first and a second counterbore adjacent a first and second of said ends, respectively, a set of threads having a lesser root diameter than the diameter of said counterbores, the first of said ends being a flat annulus lying in a plane which is normal to the central axis; the exterior surface including a tapered section having a larger and a smaller end, said larger end being closer to the first end of the nut than the smaller end the cross-section of the collar decreasing from the larger to the smaller end of the tapered section, a circumferential bead contiguous to the smaller end of the tapered section, said bead having greater radial dimensions than corresponding radial dimensions of the smaller end of the tapered section, a groove contiguous to the bead on the opposite side thereof from the tapered section so that the groove is axially aligned with the second counterbore with its edge adjacent the bead substantially axially aligned with the intersection of the threads and the second counterbore, a transition section adjacent to the groove, and a wrench-engaging section between the transition section and the second end, the transition section having a lesser cross-section area and lesser corresponding exterior transverse dimensions than the wrench-engaging section, and a greater cross-section area and greater corresponding exterior transverse dimensions than the cross-section of the collar at the groove; the cross-section shape of the central opening taken in planes which are normal to the central axis being substantially circular throughout the axial length of the collar, except at sections which include the bead, at which latter sections the cross-section shape of the central opening is non-circular, whereby the entry of the bolt into the non-circular sections serves to develop retentive forces by virtue of the rounding out of the sections caused by entry of the bolt, the sections in said planes which include the bead having a greater cross-sectional area than the sections which include the smaller end of the tapered section, the cross-section area of said nut in said planes being least at those sections which include the groove, whereby when the collar is threaded onto said bolt and is brought to bear against an object, the first counterbore clears the threads on the bolt, and the bolt threads engage the threads in the collar, the second counterbore clearing whatever portion of the bolt projects therein, application of the predetermined torque causing the nut to fracture at a section which includes the groove so that the wrench-engaging section, including the transition section, can fall free, leaving the portion of the nut which lies between the first end and the groove engaged to the bolt, and permitting the portion of the nut between the groove and the second end to come free.

2. A collar according to claim 1 in which the cross-sectional configuration of the central opening in planes which include the bead is substantially elliptical.

References Cited in the file of this patent

UNITED STATES PATENTS

| 332,540 | Law | Dec. 15, 1885 |
| 341,146 | Howes | May 4, 1886 |
| 1,677,269 | Burghart | July 17, 1928 |
| 2,255,286 | Harvey | Sept. 9, 1941 |
| 2,563,976 | Torosian | Aug. 14, 1951 |
| 2,686,546 | MacLean | Aug. 17, 1954 |